US006816499B1

(12) United States Patent
Povse et al.

(10) Patent No.: US 6,816,499 B1
(45) Date of Patent: Nov. 9, 2004

(54) HIGH SPEED TOKEN RING PORT CONFIGUROR

(75) Inventors: Max Robert Povse, Apex, NC (US); Larry Wayne Reynolds, Cary, NC (US); Edward Stanley Suffern, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/330,969

(22) Filed: Jun. 11, 1999

(51) Int. Cl.[7] .............................................. H04L 12/56
(52) U.S. Cl. ..................................... 370/421; 375/257
(58) Field of Search ................................ 370/200, 254, 370/257, 258, 419, 420, 421; 326/21, 30; 333/22 R, 262; 375/258, 257, 286, 287, 288

(56) References Cited

U.S. PATENT DOCUMENTS

| | | | | |
|---|---|---|---|---|
| 4,882,728 A | * | 11/1989 | Herman ....................... | 370/254 |
| 5,317,560 A | * | 5/1994 | Ingre et al. .................. | 370/407 |
| 5,533,054 A | * | 7/1996 | DeAndrea et al. ........... | 375/286 |
| 5,625,621 A | | 4/1997 | Christensen et al. ......... | 370/248 |
| 5,659,273 A | * | 8/1997 | Harpham .................... | 333/22 R |
| 5,680,397 A | | 10/1997 | Christensen et al. ......... | 370/421 |
| 5,784,408 A | * | 7/1998 | Lau ............................. | 375/258 |
| 5,799,040 A | * | 8/1998 | Lau ............................. | 375/258 |
| 5,825,259 A | * | 10/1998 | Harpham .................... | 333/22 R |
| 5,896,417 A | * | 4/1999 | Lau ............................. | 375/258 |
| 5,912,924 A | * | 6/1999 | Dreyer et al. ................ | 375/257 |
| 5,995,353 A | * | 11/1999 | Cunningham et al. ...... | 361/111 |
| 6,278,695 B1 | * | 8/2001 | Christensen et al. ........ | 370/254 |
| 6,418,481 B1 | * | 7/2002 | Mancusi et al. ............. | 709/250 |
| 6,459,739 B1 | * | 10/2002 | Vitenberg .................... | 375/258 |
| 6,504,851 B1 | * | 1/2003 | Abler et al. ................. | 370/466 |

OTHER PUBLICATIONS

Nikodem, M.; Bhattacharyya, B.B.; A novel method for realizing switched–capacitor transformers; ☐☐Circuits and Systems, 1991. Conference Proceedings, China., 1991 International Conference on, Jun. 16–17, 1991 pp.: 260–263 vol. 1.*

* cited by examiner

*Primary Examiner*—Chi Pham
*Assistant Examiner*—Keith M. George
(74) *Attorney, Agent, or Firm*—Joscelyn G. Cockburn

(57) ABSTRACT

A device that automatically configures the high speed (100 Mbps) port of a switch both physically and logically is provided. For physical configuration, the device determines the transmit pair conductor and the receive pair conductor interconnecting a switch port and Data Terminal Equipment (DTE). The switch port can be termed "Primary" while the connected DTE is termed "Secondary" or vice versa. For logical configurations, the device makes the determination. The device includes a switching relay, a controller and impedance matching transformers. The controller switches the connections between the relay and the transformer so that the impedance is substantially constant even though the output from the high speed port is feeding different resistive transmission lines.

24 Claims, 4 Drawing Sheets

HIGH SPEED TOKEN RING PORT CONFIGUROR

BACKGROUND OF THE INVENTION

1. Field of the Invention

The present invention relates to network interconnecting devices in general and, in particular, to LAN switches in which the ports are configured to enable communications between the port and attached devices.

2. Prior Art

The interconnection of devices with LAN switches is well known in the prior art. Two types of communications protocols are used to effectuate communications in the network. The Token Ring and ethernet or CSMA/CD (Collision Detect) are the major types of protocol that are well known. The present invention (described below) relates to the Token Ring protocol and further discussion of ethernet or CSMA/CD will not be given.

The details of the Token Ring protocol are set forth in the IEEE 802.5 standard for Local Area Network (LAN) and are incorporated herein by reference. As a consequence, only the portions of the standard that are required to understand the present invention will be given. Historically, Token Ring has a 4 Mbps (Mega bit per second) or 16 Mbps data transmission rate. The protocol for Token ring is usually implemented in a Medium Access Control (MAC) chip which is embedded in a device termed "adapter" which interfaces a device or switch port to the transmission mechanism that interconnects the switch port and the device.

In order to simplify system setup and make the switch more user friendly, circuit arrangements, termed "configuror", are provided in the ports to reconfigure them so that the communication between ports and attached devices is made possible. Examples of prior art configurors and methods are set forth in U.S. Pat. Nos. 5,625,621 and 5,680,397. Both patents are assigned to the assignee of the present invention and are incorporated herein by reference.

In order to increase the speed and throughput of Token Ring networks, the IEEE 802.5 Amendment 1 has promulgated a 100 Mbps standard. Among the things or requirements set forth in the standard are signal shape and other signal characteristics that are sensitive to impedance changes. To be compatible with the standard, the 100 Mbps must be met with different types of cable, such as Shielded Twisted Pair (STP), Unshielded Twisted Pair (UTP), with different types of resistance (i.e., 150 Ohms or 100 Ohms).

In view of the IEEE 802.5 Amendment 1, there is a need for device to reconfigure high speed port of a Token Ring Switch.

SUMMARY OF THE INVENTION

The present invention provides a circuit arrangement (configuror) that configures high speed ports so that signals on the transmit and receive conductors meet the IEEE 802.5 Amendment 1 standard (incorporated herein by reference) without causing signal degradation on both UTP and STP wiring. The circuit arrangement, also, compensates for variations in transmission impedance. A software protocol is then executed as a dialogue between partners (port and attached device) so that both can appropriately auto detect and configure.

The circuit arrangement includes two impedance matching transformers with first and second sets of windings connected to different pins in different connectors located at the high speed port of the switch. A third and fourth Sets of windings are switchable coupled to a switching relay. A controller drives the switching relay so that a capacitor coupled to the primary side of one of the transformer connects the transmit pair to ground potential whether the configuration is in a straight feed through mode or a cross-over mode. In the straight feed through mode, signals are received through selected windings of one of the transformers and signals are transmitted through selected windings of the other transformer.

In crossover mode, signals are transmitted via selected windings of said one of the transformer; whereas signals are received via selected ones of the other transformers. The above, as well as additional features and advantages of the present invention, will become apparent.

DETAILED DESCRIPTION OF THE PREFERRED EMBODIMENT

Figure 1:
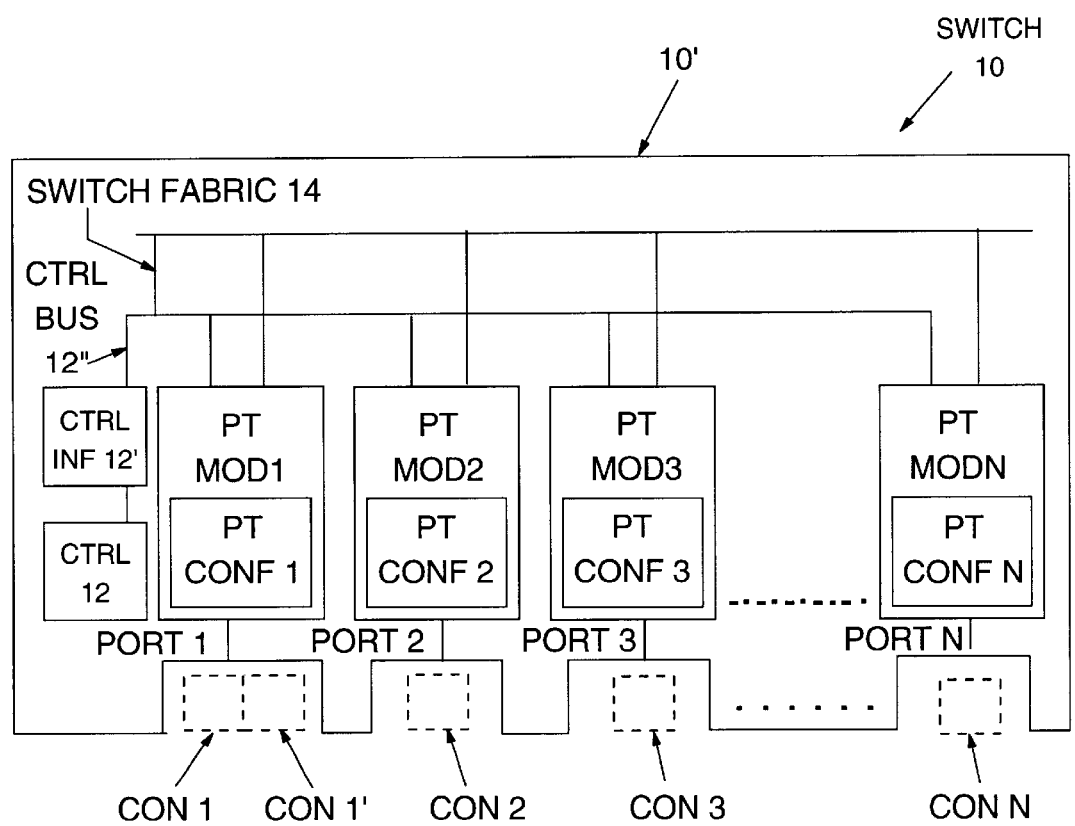
FIG. 1 shows a switch with a high speed port according to the teachings of the present invention.

FIG. 1 shows a schematic of a Switch 10 embodying the teachings of the present invention. Switch 10 includes Housing 10' to which a plurality of ports, port 1 through port N, are fabricated. In the figure, port 1 is the high speed (100 Mbps) port which is designed and managed pursuant to IEEE 802.5 and IEEE 802.5 Amendment 1, which are incorporated herein by reference. In the preferred embodiment of this invention, port 1 is fitted with two connectors identified as Con 1 and Con 1'. The dual connectors and other port structures, including the "configuror", are not part of the standard. As will be explained hereinafter, Connector 1 could be connected to one type of media with a first type of impedance; whereas, Connector 1' is connected to another type of media with a different impedance. In the preferred embodiment of the invention, one of the connectors is connected to a 100 Ohms transmission line, while the other is connected to a 150 Ohms transmission line. The transmission lines are twisted pair, shielded or unshielded. The other ports, 2 through N in the switch, are provided with connectors labeled Con 2 through Con N. In the preferred embodiment of this invention, each of these ports can operate as specified in the IEEE 802.5 standard. Essentially, these ports can operate at 4/16 Mbps. The configuration of these ports are in accordance with the teachings set forth in the above referenced IBM patents which are incorporated herein by reference.

Each of the ports is connected by a port (PT) module (MOD) to a Switch Fabric 14. Each of the port modules, 2 through port module N, are provided with a Port 18 Configuror 2 through Port Configuror N. The port configuror configures the port in accordance with the teachings set forth in the above referenced IBM patents. In addition, each of the port modules 2 through port module N are provided with circuitry in accordance with the teachings of IEEE 802.5 standard for Token Ring. Since this standard and mode of configuration are well known in the art, further description or discussion of these modules will not be given. The remaining portion of this document relates to the High Speed Port 1 which is the subject matter of the present invention.

Still referring to FIG. 1, the Port Module 1 includes Medium Access Control (MAC) functions in accordance with the IEEE 802.5 standard for Token Ring. These standards are well known In the prior art and, therefore, a detailed description will not be given. Suffice it to say that the functions enable the transmission and reception of frames. The Port Configuror 1 provides configuration for the high speed port. The IEEE 802.5 Amendment 1 describes the details; such as, signal characteristics which are required to operate the port at high speed are incorporated herein by reference.

Still referring to FIG. 1, the Switch Fabric 14 exchanges information between ports of the switch, thereby enabling the device not shown connected to any one of the ports to communicate with the device connected on the other port. The Switch Fabric 14 can be as simple as a high speed bus or as complicated as a cross-point switch. These switching sub-assemblies are well known in the prior art and further description will not be given. A Controller 12 through a Control Interface 12' and a Control Bus 12" provide connection to the switch fabric and each of the port modules. The Controller 12 and its attachment provide the switch level functions such as:

Timing signals for the switch fabric

Port-to-Port routing based on the source and destination address of the data

Broadcasting of data among multiple ports

Frame data address resolution (determine the exit port based on the destination address in the data)

In the the preferred embodiment of the invention, Controller 12 is a programmed microprocessor.

Figure 2:
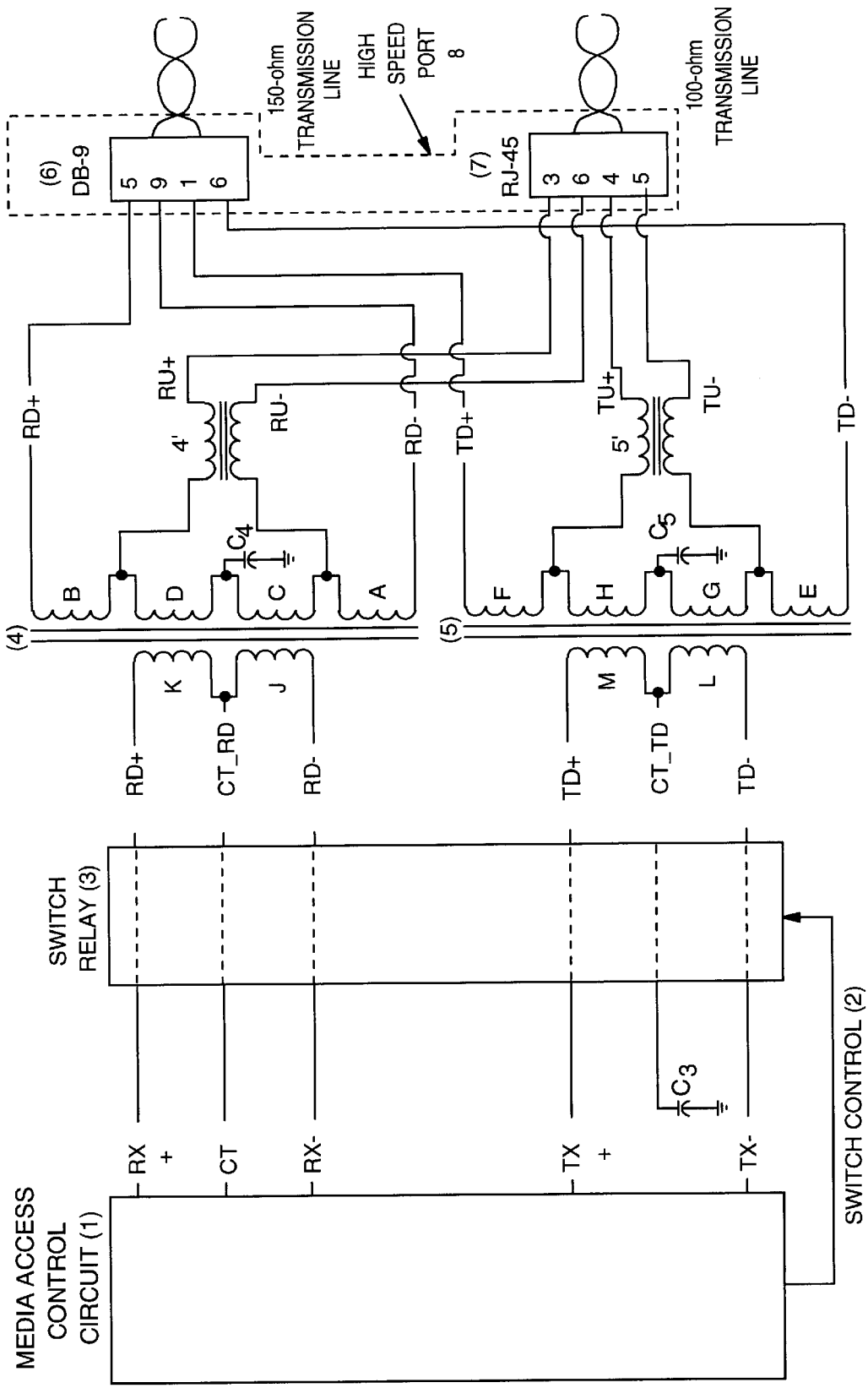
FIG. 2 shows the Port Configuror arranged in the Straight Feed Through mode.
Figure 3:
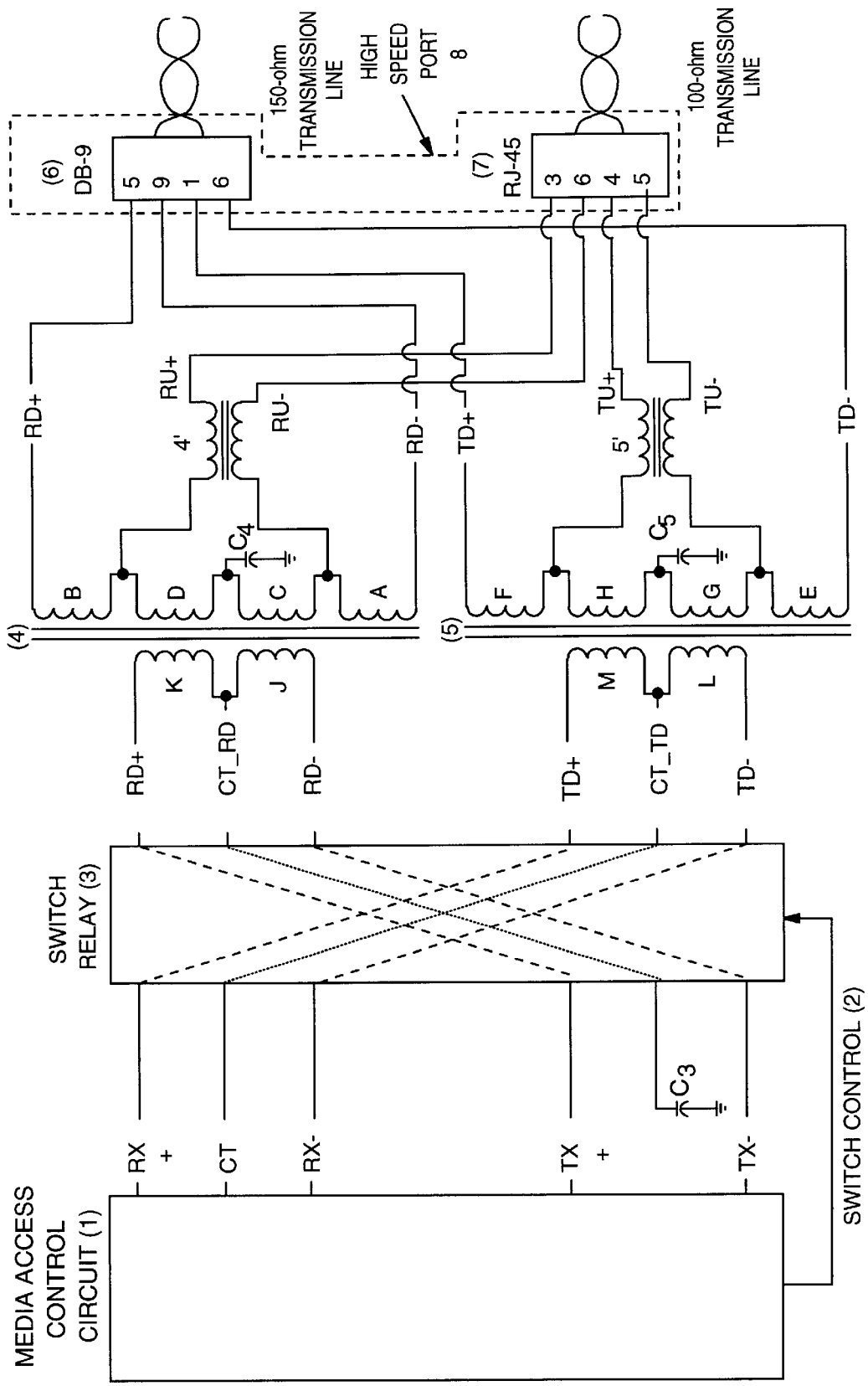
FIG. 3 shows a Port Configuror in the Cross-Over mode.

FIGS. 2 and 3 show circuit diagrams for the circuit arrangement termed "Port Configuror" provided in the high speed switch port. The function of the Port Configuror is to configure the port so that data terminal equipment such as a PC, server, word processing station, etc., connected to the port can exchange information between the port and the device. As stated previously, the configuration is both physical and logical. For the physical configuration, the transmit pair and receiver pair of conductors are determined; whereas, for the logical configuration, the port is marked primary or secondary in accordance with the terminology used in IEEE 802.5 standard for Token Ring. Similarly, the station that is connected to the port is characterized as a primary or secondary.

Still referring to FIGS. 2 and 3, the primary difference between these two figures is that in FIG. 2, the port is configured in a straight feed through mode; whereas, in FIG. 3, the port is configured in a cross-over mode. The distinction between the straight feed through and cross-over mode will be given as soon as the basic circuit arrangement is described. Because both figures are substantially identical except for the setting in switch relay 3, FIG. 3 will be used to describe the port configuror. It should be noted that common elements in both figures are identified with similar characters.

Referring now to FIG. 3, two connectors labeled 6 and 7 are positioned in the high speed Port 8 of the switch. In the preferred embodiment of this invention, Connector 6 is a DB-9 Connector with its output connected to a 150 Ohms transmission line. This transmission line connects the Connector 6 to a data terminal equipment at the other end (the data terminal is omitted for simplification and clarity). The DB-9 Connector includes four terminals labeled 6, 1, 9 and 5. Terminals 5 and 9 are the "read" terminal (RD+, RD-) and are connected to Windings A and B of Transformer 4. Terminals 1 and 6 of Connector 6 are the "transmit" terminals (TD+, TD-) and are connected to Windings E and F of Transformer 5.

Still referring to FIG. 3, Connector 7 is an RJ-45 connector and its output is connected to 100 Ohms transmission line which connects the connector to a device not shown. Connector 7 includes pins 5, 4, 6 and 3. Pins 3 and 6 are the pins for the read signal and are connected through Coil 4' to Windings C and D of Transformer 4. Similarly, Pins 4 and 5 of Connector 7 are the transmit pins and are connected through Coil 5' to Coils G and H of Transformer 5. A Capacitor C4 connectors the center tap between Windings C and D to a ground potential. Likewise, Capacitor C5 connects the center tap of Windings G and H to a ground potential.

Still referring to FIG. 3, the primary side of Transformer 4 has two windings labeled J, K and port connection labeled RD+, CT-RD (a center tap) and RD-. These port connections are coupled through Switching Relay 3 to terminals labeled Rx+, CT and Rx- on the Media Access Control Circuit 1. As will be explained subsequently, the connection of these terminals can be changed depending on the signal which Media Access Control Circuit 1 outputs on Switch Control 2.

Still referring to FIG. 3, Transformer 5 has a primary side with Windings L, M and port connections labeled TD+, CT TD (center tap), and TD-. The Media Access Control Circuit 1 has terminal Tx+, Tx-. A Capacitor C3 couples the Switch Relay 3 to a ground potential.

FIG. 3 shows a system configured in a cross-over mode configuration. In the cross-over mode configuration, the transmit terminals (Tx+, Tx-) of the assembly is connected through Switch Relay 3 to the read positive (RD+) and read negative (RD-) terminal of the Transformer 4. In addition, C3 is coupled through the switching relay to the center tap (CT-RD) of Transformer 4. Likewise, the Rx+, Rx- and CT terminals of the Media Access Control Circuit 1 are connected through Switch Relay 3 to TD+, CT-TD, and TD- of Transformer 5. In this cross-over mode, the center tap terminal of Transformer 4 Is connected through C3 to a ground potential. The control signal for changing the contacts of Switch Relay 3 is provided on Switch Control 2 and is generated by the Media Access Control Circuit 1 (details to be given hereinafter).

With reference to FIG. 2, for the moment, the showing in FIG. 2 represents the circuit arrangement in the straight feed through configuration. In the feed through configuration, Rx+ is connected to RD+, CT is connected to CT RD, and Rx- is connected to the RD- terminal of Transformer 4. Similarly, Tx+ is connected to TD+ and CT TD is connected through Capacitor C3 to ground potential. Finally, Tx- is connected to TD- of Transformer 5. In essence, in the feed through configuration there is no cross-over. The receiver terminal, negative and positive, of the Media Access Control Circuit 1 is tied to the read terminals and center tap terminal of Transformer 4. In a similar manner, the transmit (Tx+ and Tx-) are tied to TD+, TD- of Transformer 5 and C3 is tied to CT TD of Transformer 5. As stated above, the switching of the Switch Relay 3 to make the proper connection is determined by the circuit in the media access control of the port. It is this control circuit that will now be described.

Figure 4:
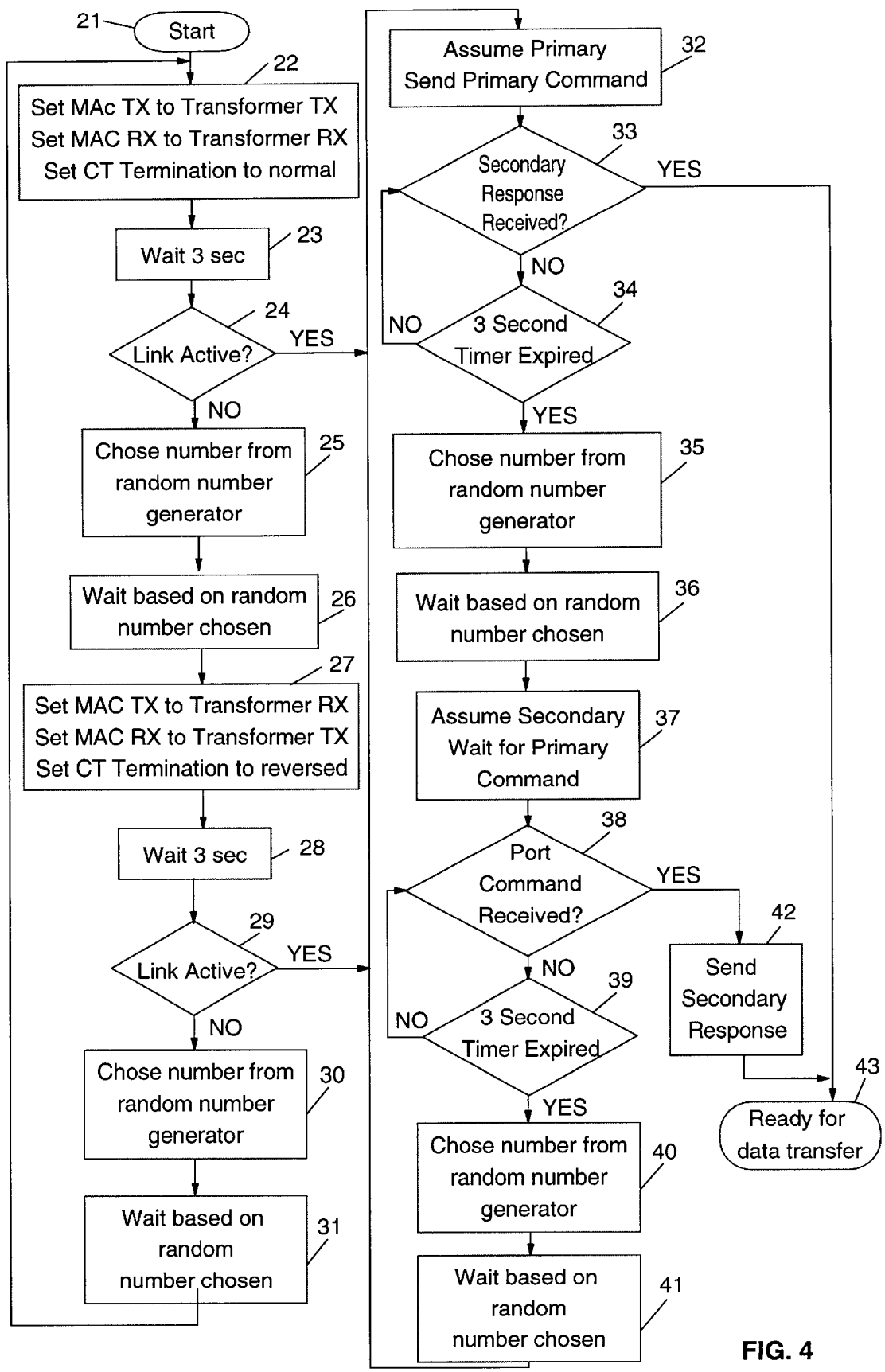
FIG. 4 shows the flowchart of a program used by the port controller to configure the port.

In the preferred embodiment of this Invention, the controller is a microprocessor located within the Media Access Control Circuit 1 executing the program shown in FIG. 4. The program on the left side of an imaginary broken line (not shown) is used to configure the port physically. Stated another way, the program is used to determined the pair of conductors that are the transmit pair and the pair of conductors that are the receive pair. The circuit on the right side of the imaginary dotted line (not shown) configures the circuit logically. In other words, the flowchart on the right side of the broken line (not shown) identifies the port which is termed "primal" or "secondary". The primary and secondary designations are in accordance with the IEEE 802.5 standard. Likewise, the station or device which is connected to the port can be termed either "primary" or "secondary". As stated previously, the device or station which is connected to the port is provided with an adapter practicing the 802.5 protocol. Likewise, an adapter or functions of adapters practicing the same IEEE standard for Token Ring is provided at the port of the switch. With reference to FIGS. 2, 3 and 4, when the machines are first powered on, the main processor (Controller 12—FIG. 1) executes diagnostics to verify the operation of the Token Ring design.

Once a link active signal has been detected by (24) or (29), the physical connection has been established. Each end must now make the logical connection using a similar process. This process is started by (32) in which the Media Access Control Circuit 1 assumes it is the primary end and sends a primary command (32) to logically establish a connection with the secondary. The Media Access Control Circuit 1 then tests for a secondary response in (33) and (34) for a period of three seconds. If a response is received, the Media Access Control Circuit 1 informs the system processor that it is ready for transferring data (43). If no response is received, a random wait time is generated with (35) and (36) as described previously. However, in this scenario, the Media Access Control Circuit 1 changes to secondary (37) and waits up to three seconds for a primary command to be received (38 and 39). If a primary command is received, the Media Access Control Circuit 1 sends a secondary response (42) to the primary command and it is ready for data transfer (43). If no response is received, a random wait time is generated with (40) and (41) and the process is repeated until both the primary and secondary ends have established a logical connection. When a logical connection is established, the system processor CTRL 12 is notified that the Media Access Control Circuit 1 is ready for data transfer (43).

In summary, the teachings of the present invention configures the high speed port of the switch. The configuration is done both physically and logically. The high speed station is a full duplex station which is able to transmit and receive data simultaneously; thus, meeting the requirement set forth in IEEE 802.5 Amendment 1 for 100 megabits per second station.

While the invention has been particularly shown and described with reference for preferred embodiment, it will be understood by those skilled in the art that various changes in both form and detail may be made therein without departing from the scope and spirit of the invention.

Having thus described our invention, what we claim is as follows:

1. A switch including:
   a housing;
   a switch fabric mounted within said housing;
   at least one high speed port to be used to connect data terminal equipment to said switch;
   circuit arrangement coupled the at least one high speed port to the switch fabric, said circuit arrangement providing functions for processing data to enable data movement from the high speed port to the switch fabric and vice versa; and
   a port configuror configuring the at least one high speed port to enable communications between said at least one port and an attached device, said configuror including a first transformer having secondary windings and primary windings with a positive center tap and negative terminals thereon; a second transformer having secondary windings and primary windings with a positive terminal, a negative terminal and a center tap terminal coupled through a capacitor and no resistor to a first referenced voltage level and a switching relay assembly operatively coupled to terminals of the primary windings of the first transformer and the primary windings of the second transformer wherein said capacitor is being connected in series to said center tap and said first reference voltage level.

2. The switch of claim 1 wherein the switch fabric includes a high speed bus.

3. The switch of claim 1 wherein the switch fabric includes a cross-point switch.

4. The switch of claim 1 wherein the high speed port meets IEEE 802.5 and ethernet standards for high speed data transmission.

5. The switch of claim 1 wherein the high speed port operates at 100 mbps.

6. A switch including:
   a housing;
   a switch fabric mounted within said housing;
   at least one port to be used to connect data terminal equipment to said switch;
   circuit arrangement to couple the at least one port to the switch fabric, said circuit arrangement providing functions for processing data to enable data movement from the port to the switch fabric and vice versa; and
   a port configuror configuring the at least one port to enable communications between said at least one port and an attached device, said configuror including a first transformer having secondary windings and primary windings with a positive center tap and negative terminals thereon; a second transformer having secondary windings and primary windings with a positive terminal, a negative terminal and a center tap terminal coupled through a first capacitor to a first referenced voltage level and a switching relay assembly operatively coupled through a second capacitor to the first reference voltage and to terminals of the primary windings of the first transformer and the primary windings of the second transformer wherein the switching relay assembly is responsive to control signals to connect the second capacitor to the center tap terminal of the primary winding of the second transformer to configure the at least one port in a first port configuration mode and to connect the second capacitor to the positive terminal on the primary winding of the first transformer so as to configure the at least one port in a second mode.

7. The switch of claim 6 wherein the switch fabric includes a high speed bus.

8. The switch of claim 6 wherein the switch fabric includes a cross-point switch.

9. The switch of claim 6 wherein the at least one port includes a high speed port.

10. The switch of claim 9 wherein the high speed port operates at 100 mega bits per second (Mbps).

11. The switch of claim 6 further including a Medium Access Control Circuit including a Positive Receive (+Rx) Port connection, a Negative Receive (−Rx) Port connection, a Center Tap (CT) Port connection, a Positive Transmit (+Tx) connection and a Negative Transmit (−Tx) connection.

12. The switch of claim 11 wherein the Medium Access Control Circuit further includes a main processor executing a program that causes the relay to connect the Rx+ port connection to the RD+ terminal, the CT port connection to the CT-Rx terminal, the Rx− port connection to the RD− terminal, the Tx+ port connection to the TD+ terminal and the Tx− port connection connected to the TD− terminal if the port is in the first port configuration mode.

13. The switch of claim 12 wherein the microprocessor further generates a first message which is forwarded and if a second message is received, the at least one port is fully configured and ready for data transmission and reception.

14. The switch of claim 11 wherein the Medium Access Controller further includes a microprocessor executing a program that provides control signals that cause the switching relay to connect Rx+ to TD+, CT to CT-TD, Rx− to TD−, Tx+ to RD+, the capacitor to CT RD and Tx− to RD−.

15. The switch of claim 14 wherein the microprocessor further generates a first message which is sent and if a second message is received, the at least one port is deemed fully configured and ready for data transmission and reception.

16. The switch of claim 6 wherein the secondary windings of the first transformer include a plurality of windings with one set of the plurality of windings coupled through a first coil to port connections in said at least one port and a one set of windings from the secondary windings of the second transformer is coupled through a second coil to port connections in the at least one port.

17. The switch of claim 16 further including a connector coupled to the port connections in the at least one port.

18. The switch of claim 17 wherein the connector includes an RJ-45.

19. The switch of claim 16 wherein another set of windings from the secondary windings of the first transformer is coupled to port connections in the at least one port and another set of windings from the secondary windings of the second transformer is coupled to port connections in said at least one connector.

20. The switch of claim 19 further including a connector connected to the port connections.

21. The switch of claim 20 wherein the connector includes a DB-9 connector.

22. A device for configuring the port of a switch including:
   a controller including a programmed microprocessor and circuits generating switch control signals outputted at a switch port connection, transmit signals outputted at Tx+ and Tx− port connections and Rx+ CT and Rx− port connections to receive signals;
   a switch relay operatively coupled to the port connections;
   a first transformer having secondary windings and primary windings with RD+, RD− and CT-RD connections operatively coupled to the switch relay;
   a second transformer having secondary windings and primary windings with TD+, CT-TD, and TD− connections operatively coupled to the switch relay; and
   a capacitor coupled to a first voltage potential, said capacitor operable to be connected through the switch relay to the CT-RD connection or CT-TD connection.

23. The device of claim 22 further including a first coil coupling one set of the secondary windings on the first transformer to connections in the at least one port and a second coil coupling one set of the secondary windings on the second transformer to connections in the at least one port.

24. The device of claim 23 wherein another set of the secondary windings on the first transformer is operatively coupled to connections in the at least one port and, another set of coils in the secondary windings of the second transformer is operatively coupled to connections in the at least one port.

* * * * *